US009423915B2

(12) United States Patent
Kang et al.

(10) Patent No.: US 9,423,915 B2
(45) Date of Patent: Aug. 23, 2016

(54) FLEXIBLE TOUCH SCREEN PANEL AND FLEXIBLE DISPLAY DEVICE WITH THE SAME

(71) Applicant: SAMSUNG DISPLAY CO., LTD., Yongin, Gyeonggi-Do (KR)

(72) Inventors: Sung-Ku Kang, Yongin (KR); Tae-Hyeog Jung, Yongin (KR); Kyu-Taek Lee, Yongin (KR); Choon-Hyop Lee, Yongin (KR); Jeong-Heon Lee, Yongin (KR); Gui-Nam Min, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 14/338,196

(22) Filed: Jul. 22, 2014

(65) Prior Publication Data

US 2015/0029143 A1    Jan. 29, 2015

(30) Foreign Application Priority Data

Jul. 25, 2013 (KR) .......................... 10-2013-0087829

(51) Int. Cl.
*G06F 3/045* (2006.01)
*G06F 3/044* (2006.01)
(Continued)

(52) U.S. Cl.
CPC ........... *G06F 3/044* (2013.01); *G02F 1/13338* (2013.01); *G06F 1/1652* (2013.01); *G06F 3/0412* (2013.01); *G09F 9/301* (2013.01); *H04M1/0268* (2013.01); *G02F 2001/133531* (2013.01); *G06F 2203/04102* (2013.01); *G06F 2203/04103* (2013.01); *H04M 2250/22* (2013.01)

(58) Field of Classification Search
CPC .............. G06F 1/1652; G06F 3/0412; G06F 2203/04103; G06F 2203/04102; G06F 3/044; H04M 1/0268; H04M 2250/22; G02F 1/13338; G02F 2001/133531; G09F 9/301
See application file for complete search history.

(56) References Cited

U.S. PATENT DOCUMENTS

| 4,592,623 A * | 6/1986 | Yamamoto ........... G02B 5/3033 349/122 |
| 2007/0128382 A1 | 6/2007 | Hayashi et al. |

(Continued)

FOREIGN PATENT DOCUMENTS

| KR | 10-2011-0104406 A | 9/2011 |
| KR | 10-2012-0066444 A | 6/2012 |

(Continued)

OTHER PUBLICATIONS

EPO Search Report dated Feb. 10, 2015, for corresponding European Patent application 14178517.0, (8 pages).

*Primary Examiner* — Charles Hicks
(74) *Attorney, Agent, or Firm* — Lewis Roca Rothgerber Christie LLP

(57) ABSTRACT

A flexible touch screen panel includes a window substrate, a polarizing functional layer, sensing patterns and sensing lines. The window substrate is flexible. The polarizing functional layer is attached on a first surface of the window substrate, and is divided into an active area and an inactive area positioned outside of the active area. The sensing patterns are formed in the active area on a first surface of the polarizing functional layer. The sensing lines are formed in the inactive area on the first surface of the polarizing functional layer, and are connected to the sensing patterns. In the touch screen panel, the polarizing functional layer has a laminated structure in which a polarizer and a retardation compensation film are attached on the first surface of the window substrate.

19 Claims, 3 Drawing Sheets

(51) Int. Cl.
*G06F 1/16* (2006.01)
*G06F 3/041* (2006.01)
*H04M 1/02* (2006.01)
*G02F 1/1333* (2006.01)
*G09F 9/30* (2006.01)
*G02F 1/1335* (2006.01)

(56) References Cited

U.S. PATENT DOCUMENTS

2009/0040443 A1* 2/2009 Hada .................. G02B 5/3083
                                                         349/118
2011/0277936 A1  11/2011 Park et al.
2012/0146922 A1   6/2012 Kang et al.
2012/0275024 A1  11/2012 Marzen et al.
2012/0306777 A1* 12/2012 Kang .................. G06F 3/044
                                                         345/173
2013/0285938 A1* 10/2013 Kang .................. G06F 3/041
                                                         345/173
2013/0286330 A1  10/2013 Lee et al.

FOREIGN PATENT DOCUMENTS

KR  10-2013-0120721 A   11/2013
WO  WO 2012/091304 A2    7/2012

* cited by examiner ical Field

An aspect of the present invention relates to a flexible touch screen panel and a flexible display device including the same.

2. Description of the Related Art

A touch screen panel is an input device that allows a user's instruction to be input by selecting an instruction content displayed on the screen of a display device or the like with a user's hand or an object.

The touch screen panel is formed on a front face of the display device and converts the contact site into an electrical signal. Specifically, the user's hand or an object directly contacts the touch screen panel at the contact site. As a result, the instruction content selected at the contact site is input as an input signal to the image display device.

Since such a touch screen panel can be substituted for a separate input device (such as a keyboard or mouse) connected to a display device, applications of touch screen panels have been growing.

Touch screen panels are divided into resistive overlay touch screen panels, photosensitive touch screen panels, capacitive touch screen panels, and the like. Among these touch screen panels, the capacitive touch screen panel converts the contact site into an electrical signal by sensing a change in capacitance between a conductive sensing pattern and an adjacent sensing pattern or ground electrode when a user's hand or object comes in contact with the touch screen panel.

Generally, such a touch screen panel is attached to the outer face of a display device (such as a liquid crystal display device or organic light emitting display device). Therefore, the touch screen panel should be highly transparent and thin.

Flexible display devices have recently been developed, and the touch screen panels attached on these flexible display devices must also be flexible.

FLEXIBLE TOUCH SCREEN PANEL AND FLEXIBLE DISPLAY DEVICE WITH THE SAME

CROSS-REFERENCE TO RELATED APPLICATION

This application claims priority to and the benefit of Korean Patent Application No. 10-2013-0087829, filed on Jul. 25, 2013 in the Korean Intellectual Property Office, the entire content of which is incorporated herein by reference.

BACKGROUND

1. Technical Field

SUMMARY

According to embodiments, a flexible touch screen panel includes a polarizing functional layer and sensing patterns as touch sensors integrally formed on one surface of a window substrate having flexibility. This ensures the flexibility of the touch screen panel, decreases the thickness of the touch screen panel, and improves image visibility.

According to some embodiments, a flexible display device includes the flexible touch screen panel.

According to an aspect of the present invention, a flexible touch screen panel includes: a flexible window substrate; a polarizing functional layer attached on a first surface of the window substrate, the polarizing functional layer being divided into an active area and an inactive area positioned outside of the active area; sensing patterns formed in the active area on a first surface of the polarizing functional layer; and sensing lines formed in the inactive area on the first surface of the polarizing functional layer, the sensing lines being connected to the sensing patterns. The polarizing functional layer has a laminated structure of a polarizer and a retardation compensation film, which are attached on the first surface of the window substrate.

The polarizer may be attached on the first surface of the window substrate by a transparent adhesive layer, and the retardation compensation film may be attached on a first surface of the polarizer by a transparent adhesive layer.

The first and second transparent adhesive layers may each be a solvent-type adhesive or a film-type adhesive. The solvent-type adhesive may be an aqueous poly vinyl alcohol (PVA) adhesive, a polyester-based adhesive, a polyurethane-based adhesive, or a combination thereof. The film-type adhesive may be a polyacryl-based adhesive, a polysilicon-based adhesive, or a combination thereof.

The window substrate may be formed of polymethyl methacrylate (PMMA), acryl, polyester (e.g., polyethylene terephthalate (PET)), or a combination thereof.

The polarizer may be made by stretching a polymer film, and has an absorption axis in the stretched direction. The absorption axis of the polarizer may be such that the angle between the absorption axis of the polarizer and a bending axis of the touch screen panel is about 45 to about 90 degrees.

The sensing patterns may include first sensing patterns for connection along a first direction; first connecting lines for connecting the adjacent first sensing cells to each other; second sensing patterns for connection along a second direction; and second connecting lines for connecting the adjacent second sensing cells to each other. An insulating layer may be positioned at the points of intersection of the first connecting lines and the second connecting lines.

According to another aspect of the present invention, a flexible display device having a flexible touch screen panel includes: a flexible window substrate; a polarizing functional layer attached on a first surface of the window substrate, the polarizing functional layer being divided into an active area and an inactive area positioned outside of the active area; sensing patterns formed in the active area on a first surface of the polarizing functional layer; and sensing lines formed in the inactive area on the first surface of the polarizing functional layer, the sensing lines being connected to the sensing patterns. The flexible display device is attached to face the sensing patterns and the sensing lines in the direction of the first surface of the window substrate. The polarizing functional layer has a laminated structure of a polarizer and a retardation compensation film, which are attached on the first surface of the window substrate.

The flexible display device may be an organic light emitting display device.

BRIEF DESCRIPTION OF THE DRAWINGS

The above and other advantages and features of the present invention will be better understood by reference to the following detailed description when considered in conjunction with the attached drawings, in which.

DETAILED DESCRIPTION

Figure 1:
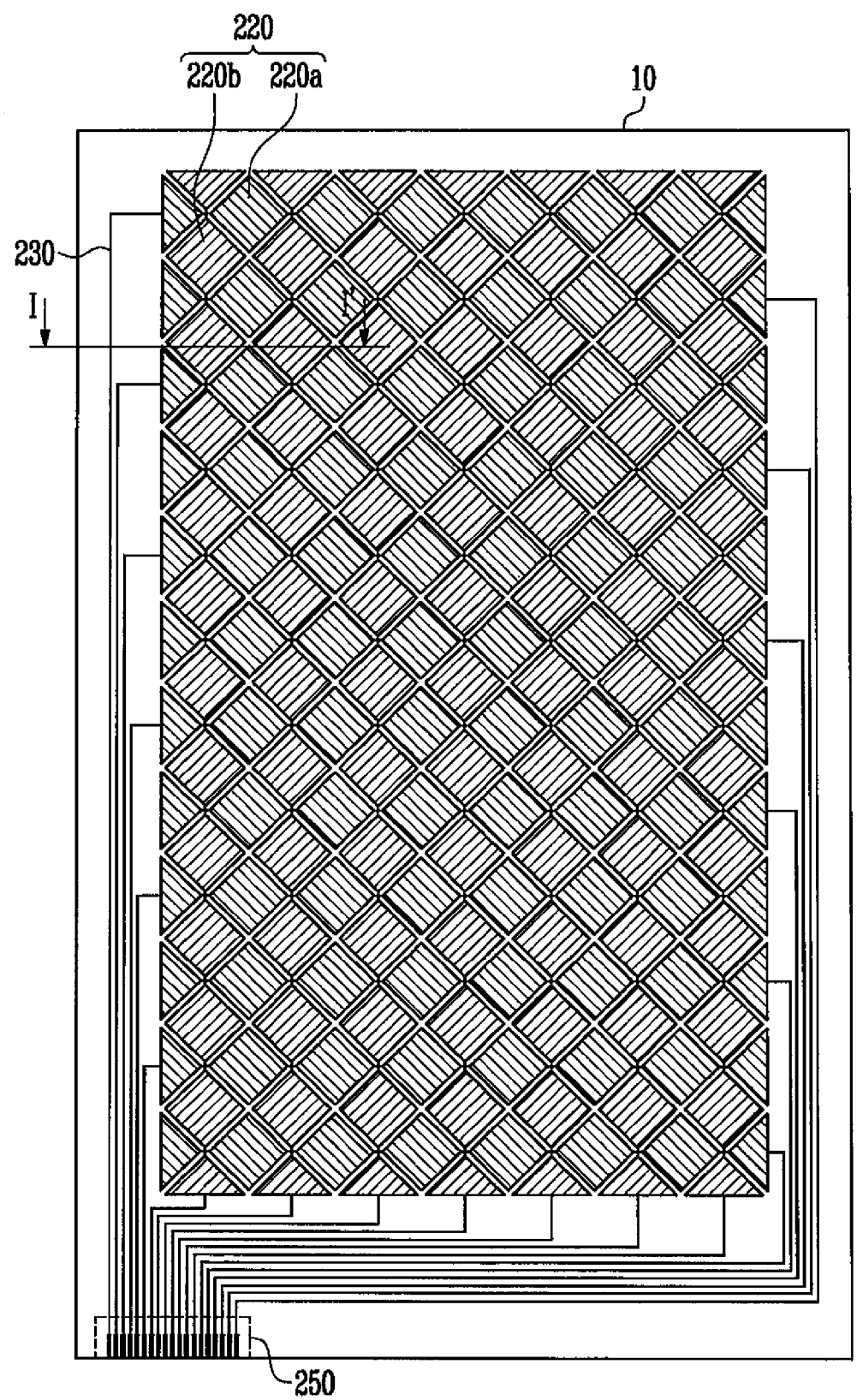
FIG. 1 is a schematic plan view of a touch screen panel according to an embodiment of the present invention.

Exemplary embodiments will now be described with reference to the accompanying drawings. In the following detailed description, only certain exemplary embodiments of the present invention have been shown and described, simply by way of illustration. As those skilled in the art would realize, the described embodiments may be modified in various different ways without departing from the spirit and scope of the present invention. Accordingly, the drawings and description are to be regarded as illustrative in nature and not restrictive. In addition, when an element is referred to as being "on" another element, it can be directly on the other element or be indirectly on the another element with one or more intervening elements therebetween. Also, when an element is referred to as being "connected to" another element, it can be directly connected to the other element or indirectly connected to the other element with one or more intervening elements therebetween. It will be understood that when an element is referred to as being "between" two elements, it can be the only element between the two elements, or one or more intervening elements may also be present. In the drawing figures, dimensions may be exaggerated for ease of illustration. Like reference numerals refer to like elements throughout.

Figure 2:
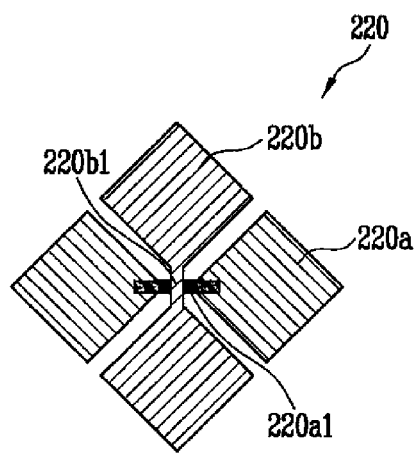
FIG. 2 is an enlarged view of an exemplary sensing pattern of the touch screen panel of FIG. 1.
Figure 3:
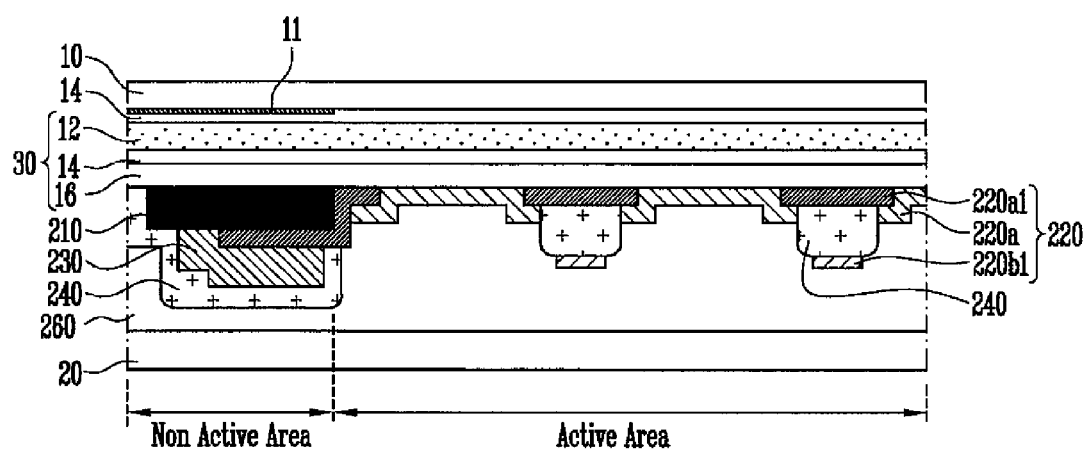
FIG. 3 is a sectional view of the area I-I' in FIG. 1.

FIG. 1 is a schematic plan view of a touch screen panel according to an embodiment of the present invention. FIG. 2 is an enlarged view of an exemplary sensing pattern of the touch screen panel of FIG. 1. FIG. 3 is a sectional view of the area I-I' of the touch screen panel of FIG. 1. Referring to FIGS. 1 to 3, the touch screen panel according to an embodiment includes a flexible window substrate 10, a polarizer 12 and a retardation compensation film 16 sequentially attached on one surface (i.e., the inner surface) of the window substrate 10, sensing patterns 220 formed on one surface of the retardation compensation film 16, and sensing lines 230 configured to connect the sensing patterns 220 to an external driving circuit (not shown) through a pad portion 250.

According to some embodiments, the window substrate 10 is not made of a rigid material such as glass, but is instead made of a transparent material having flexibility, e.g., polymethyl methacrylate (PMMA), acryl, polyester (e.g., polyethylene terephthalate (PET)), polyimide (PI) or the like.

The window substrate 10 serves as a transparent substrate positioned on the outermost face of the display device, but also serves to protect and support the polarizer 12.

A polarizing functional layer 30 is formed by removing a support layer made of triacetyl cellulose (TAC), which is typically included in existing polarizing plates. The polarizer 12 and the retardation compensation film 16 are attached directly on the first surface of the window substrate 10 so that the polarizing functional layer 30 has flexibility, i.e., high bendability.

The polarizer 12 is attached on the first surface of the window substrate 10 by a transparent adhesive layer 14, and the retardation compensation film 16 is attached on the first surface of the polarizer 12 by another transparent adhesive layer 14. Thus, the laminated structure of the polarizer 12 and the retardation compensation film 16 makes up the polarizing functional layer 30.

Existing polarizing plates generally include a polarizer between upper and lower support layers, and a retardation compensation film attached on one surface of the lower support layer.

The polarizer controls the amount of light transmitted according to the degree of polarization of light incident thereon. The polarizer may include poly vinyl alcohol (PVA). For example, the polarizer achieves polarization by stretching the PVA film (which absorbs iodine) with high tension.

The support layers respectively provided on and beneath the polarizer may be films made of TAC in order to protect and support the PVA film.

The polarizing plate is generally attached to the outside of the display device in order to improve external visibility by preventing external light reflection. When the touch screen panel is attached on the display device, the polarizing plate may be attached to an outer face of the touch screen panel.

However, the polarizing plate and the touch screen panel are typically individually manufactured and then attached or assembled to each other. This results in a decrease in process efficiency and a decrease in yield.

Particularly, in the polarizing plate with the laminated structure, the polarizer has a thickness of about 20 µm, and each of the upper and lower support layers has a thickness of about 40 µm. Hence, the polarizing plate has a thickness of about 100 µm. When the polarizing plate is attached to the touch screen panel as-is, the entire thickness of the touch screen panel is increased, which is undesirable in light of the tendency toward decreased thicknesses of touch screen panels.

TAC (i.e., the material of the support layer) is relatively rigid compared to PVA. Therefore, if the polarizing plate with the support layer is attached to a flexible touch screen panel, it is difficult or impossible to ensure the flexibility or bendability of the flexible touch screen panel.

Accordingly, in an effort to overcome such disadvantages, the support layer (present in existing polarizing plates), and one surface of the polarizer 12 are attached directly to the flexible window substrate 10 (as a support body) by the transparent adhesive layer 14, as shown in FIG. 3. Then, the retardation compensation film 16 is attached to the other surface of the polarizer 12 by another transparent adhesive layer 14.

According to some embodiments, the TAC support layer in the polarizing functional layer 30 is removed, as compared with existing polarizing plates. Thus, the thickness of the polarizing functional layer 30 is decreased by about 80 µm, as compared with the thickness of existing polarizing plates, thereby improving flexibility, i.e., increasing bendability.

In some embodiments, as shown in FIG. 3, a touch screen panel has a structure in which the polarizer 12 and the retardation compensation film 16 are attached directly on the first surface of the flexible window substrate 10 by the transparent adhesive layer 14, and the sensing patterns 220 and the sensing lines 230 are formed directly on an inner surface of the retardation compensation film 16. Accordingly, the flexible touch screen panel is integral with the window substrate and the polarizing plate.

Attachment of the polarizer 12 and the retardation compensation film 16 via the transparent adhesive layer 14 may be achieved by roll-to-roll lamination or sheet lamination.

The transparent adhesive layer 14 may include a solvent-type adhesive or a film-type adhesive. The solvent-type adhesive may include an aqueous PVA adhesive, a polyester-based adhesive, a polyurethane-based adhesive, or a combination thereof. The film-type adhesive may include a polyacryl-based adhesive, a polysilicon-based adhesive, or a combination thereof.

Hereinafter, the configuration of the touch screen panel according to embodiments will be described with reference to FIGS. 1 and 2. As shown in FIG. 2, the sensing pattern 220 includes first sensing cells 220a for connecting each row line along a row direction, a first connecting line 220a1 for connecting the first sensing cells 220a along the row direction, second sensing cells 220b for connecting each column line along a column direction, and a second connecting line 220b1 for connecting the second sensing cells 220b along the column direction.

For convenience, only one sensing pattern is illustrated in FIG. 2, but it is understood that the touch screen panel includes a plurality of the sensing patterns shown in FIG. 2.

The first sensing cells 220a and the second sensing cells 220b are alternately arranged and do not overlap. The first and second connecting lines 220a1 and 220b1 intersect. An insulating layer (not shown) for promoting stability is positioned between the first and second connecting lines 220a1 and 220b1.

The first sensing cells 220a may be integrally formed with the first connecting line 220a1 using a transparent conductive material such as indium tin oxide (hereinafter, referred to as ITO), or may be formed separately from the first connecting line 220a1 and be electrically connected by the first connecting line 220a1. The second sensing cells 220b may be integrally formed with the second connecting line 220b1 using a transparent conductive material such as ITO, or may be formed separately from the second connecting line 220b1 and be electrically connected by the second connecting line 220b1.

For example, the second sensing cells 220b may be integrally formed with the second connecting line 220b1 by being patterned in the column direction. The first sensing cells 220a may be patterned to have independent patterns between the second sensing cells 220b, and may be connected along the row direction by the first connecting line 220a1 positioned above or below the first sensing cells 220a.

The first connecting line 220a1 may be electrically connected to the first sensing cells 220a by directly contacting the first sensing cells 220a above or below the first sensing cells 220a. Alternatively, the first connecting line 220a1 may be electrically connected to the first sensing cells 220a through a contact hole, etc.

The first connecting line 220a1 may be formed using a transparent conductive material such as ITO, or using an opaque low-resistance metal material. The width of the first connecting line 220a1 may be adjusted to generally prevent visualization of the sensing pattern.

The sensing lines 230 shown in FIG. 1 are respectively connected electrically to row lines of the first sensing cells 220a and column lines of the second sensing cells 220b in order to connect the row and column lines of the first and second sensing cells 220a and 220b to the external driving circuit (not shown) (such as a position detecting circuit) through the pad portion 250.

The sensing lines 230 are arranged on an inactive area positioned outside of an active area on which an image is displayed. The material of the sensing lines 230 may be any suitable material, for example, the sensing lines 230 may be formed of a transparent electrode material, such as that used to form the sensing patterns 220, or a low-resistance metallic material, such as molybdenum (Mo), silver (Ag), titanium (Ti), copper (Cu), aluminum (Al) or Mo/Al/Mo.

According to some embodiments, the touch screen panel configured as described above is a capacitive touch screen panel. When a contact object (such as a user's finger or a stylus pen) comes into contact with the touch screen panel, a change in capacitance caused by the contact site is transferred from the sensing pattern 220 to the driving circuit (not shown) via the sensing line 230 and the pad portion 250. Then, the change in capacitance is converted into an electrical signal by X and Y input processing circuits (not shown), thereby detecting the contact site.

FIG. 3 is a sectional view of a portion of a flexible display having the touch screen panel, and shows an inactive area and an active area of the touch screen panel formed on the first surface of the flexible window substrate 10.

The transparent adhesive layer 14, the polarizer 12, the transparent adhesive layer 14, and the retardation compensation film 16 are sequentially formed on the first surface of the window substrate 10. The sensing patterns 220 (and the like) of the touch screen panel are formed on the inner surface of the retardation compensation film 16.

As shown in FIG. 3, a display device 20 is attached to a bottom surface of the touch screen panel (i.e., in the direction of the first surface of the window substrate 10) by a transparent adhesive layer 260. Here, the display device 20 is a flexible display device, and may be an organic light emitting display device.

Because the organic light emitting display device is a self-luminescent device, it does not require a backlight unit, unlike existing liquid crystal display devices. Hence, a substrate of the organic light emitting display device may be made of polymethyl methacrylate (PMMA), acryl, polyester (e.g., PET), etc., all of which are flexible. Thus, the organic light emitting display device can be flexible.

The transparent adhesive layer 260 may be made of a transparent adhesive material with high light transmittance, such as super view resin (SVR) or optically clear adhesive (OCA).

Referring to FIG. 3, the sensing patterns 220 formed on the active area of the window substrate 10 include first sensing cells 220a for connecting each row line along a row direction, first connecting lines 220a1 for connecting the first sensing cells 220a along the row direction, second sensing cells 220b for connecting each column line along a column direction, and second connecting lines 220b1 for connecting the second sensing cells 220b along the column direction. An insulating layer 240 is positioned at the points of intersection of the first connecting lines 220a1 and the second connecting lines 220b1.

The thicknesses of the components (such as the sensing patterns 220) making up the touch screen panel are exaggerated in FIG. 3 for ease of illustration. In practice, the thickness of each component is much smaller than that shown in FIG. 3.

As shown in FIG. 3, a black matrix 210 and sensing lines 230 overlapping the black matrix 210 and electrically connected to the sensing patterns 220 are formed on the inactive area positioned outside of the active area.

The black matrix 210 forms a frame of the display area while preventing the visualization of patterns (such as the sensing lines) formed on the inactive area.

According to the above described structure, in some embodiments, the touch screen panel is positioned between the display device 20 and the window substrate 10, in order to generally prevent visualization of the sensing patterns and to minimize reflection while maintaining flexibility.

As shown in FIG. 3, a decoration layer 11 may be formed in an area on the first surface of the window substrate 10 that overlaps an area in which the black matrix 210 is formed.

In the touch screen panel configured as described above, the polarizer, the retardation compensation film, the sensing pattern and the like are formed for each cell on the first surface of the window substrate to form a mother substrate, and the mother substrate is then cut, thereby manufacturing a touch screen panel integral with the window substrate and the polarizing plate. Accordingly, it is possible to minimize manufacturing cost and time.

As described above, the touch screen panel according embodiments of the present invention is flexible. This means that the display device including the touch screen panel can be bent to a predetermined angle. However, the mechanical bending of the touch screen panel is direction specific due to the polarizer attached on the first surface of the window substrate. Accordingly, the image quality of the flexible display device can be improved by providing a particular angle between an absorption axis of the polarizer and a bending axis of the touch screen panel.

More specifically, the polarizer is formed by stretching a polymer film (such as a PVA-based resin), and the stretched film has molecules that are strongly arranged in the stretched direction, which defined the absorption axis of the polarizer. That is, in the polarizer, light is absorbed by iodine oriented in the stretched direction or dichroic dyes, thereby performing a polarizing function. Here, polymers are oriented in the stretched direction, and the bonding force between the polymers is therefore decreased in a direction vertical to the stretched direction. Therefore, the polarizer is easily split in the vertical direction.

Accordingly, in the design of a flexible display module (including a flexible touch screen panel) in which bending is continuously performed in a specific direction, the directional arrangement of the components will enable the flexible display module to endure a fatigue load. When the polarizer is monoaxially stretched, as described above, the bonding between molecules in the vertical direction is weaker than that in the stretched direction (which is the absorption axis of the polarizer). Thus, the flexible display module is designed so that the angle between the absorption axis of the polarizer and the bending axis of the touch screen panel ranges from about 45 to about 90 degrees, thereby generally ensuring the mechanical bendability of the polarizer.

Figure 4:
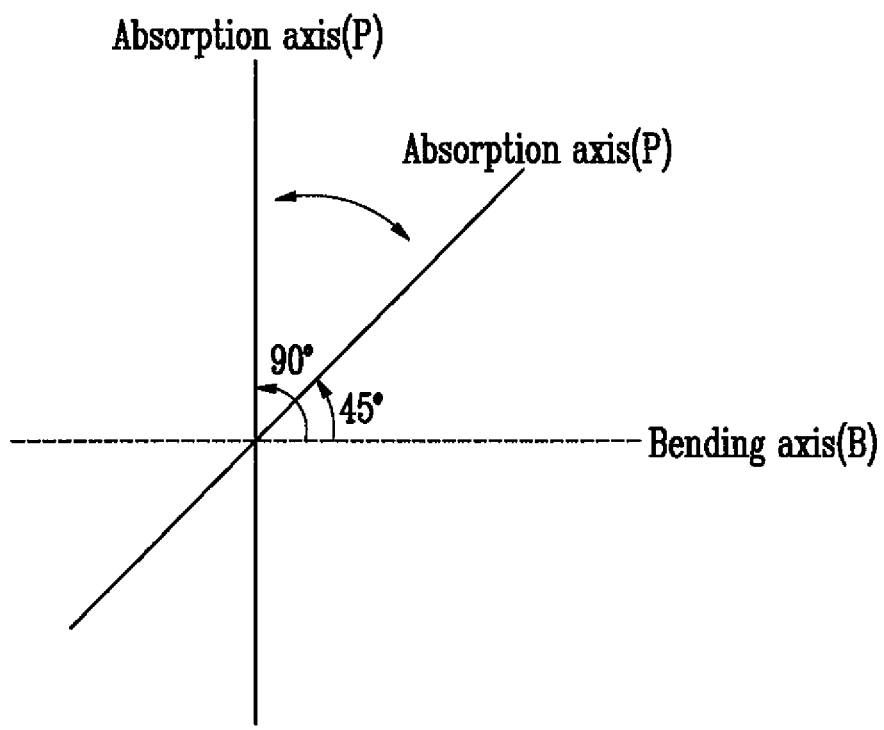
FIG. 4 is a graph showing the relationship between the absorption axis of a polarizer and the bending axis of the touch screen panel according to an embodiment of the present invention.

FIG. 4 is a graph of the relationship between the absorption axis of the polarizer and the bending axis of the touch screen panel according to embodiments of the present invention. Assuming that the bending axis B of the touch screen panel is 0 degrees, the absorption axis P of the polarizer according to an embodiment is designed to be between 45 and 90 degrees with respect to the bending axis B of the touch screen panel. For example, assuming that the absorption axis of the polarizer is 90 degrees, the molecules of the polarizer are strongly arranged in the direction of 90 degrees. The direction of 90 degrees is equal to the bending direction of the touch screen panel with respect to the bending axis B. Thus, if the angle between the absorption axis P of the polarizer and the bending axis B of the touch screen panel is 90 degrees, it is possible to minimize the occurrence of cracks in the polarizer.

On the other hand, assuming that the absorption axis P of the polarizer is 0 degrees (i.e., the same as the bending axis B), the absorption axis P is vertical to the bending direction of the touch screen panel with respect to the bending axis B. In this case, the bonding between molecules is weak in the vertical direction of the absorption axis, and therefore, cracks easily occur in the polarizer.

When the absorption axis P of the polarizer is less than 45 degrees with respect to the bending axis B, cracks occur in the polarizer due to the weakness of bonding between molecules. Accordingly, the touch screen panel is designed so that the angle between the absorption axis of the polarizer and the bending axis of the touch screen panel ranges from 45 to 90 degrees, thereby generally ensuring the mechanical bendability of the polarizer.

By way of summation and review, a capacitive touch screen panel is made by a thin film forming process, a pattern forming process and the like in order to form sensing patterns as touch sensors, etc. Therefore, characteristics such as high thermal resistance and chemical resistance are important. Accordingly, in capacitive touch screen panels, sensing patterns and the like have been conventionally formed on a glass substrate suitable for providing high thermal resistance and chemical resistance. Glass substrates need to have a thickness of a certain value or greater in order to be conveyed in the manufacturing processes. Therefore, glass substrates are not suitable for applications requiring low thickness, and cannot provide flexibility.

Display devices typically include a polarizing plate attached to an outer face of the display device in order to improve external visibility (such as, by preventing external light reflection), and a window substrate attached to the outermost surface of the display device to improve the strength of the display device. The polarizing plate, the window substrate and the touch screen panel are typically manufactured individually and then attached or assembled to one another. However, this causes an increase in the entire thickness of the touch screen panel, a decrease in process efficiency and a decrease in yield.

According to embodiments of the present invention, the polarizer is formed by removing the support layer made of TAC, which is typically included in existing polarizing plates. Also, the polarizer is attached directly on one surface of the flexible window substrate, the retardation compensation film is attached on the other surface of the polarizer, and the sensing patterns (as touch sensors) are formed on one surface of the retardation compensation film. This structure makes it possible to decrease the thickness of the touch screen panel, improve image visibility, and generally ensure flexibility.

Exemplary embodiments have been disclosed herein, and although specific terms are employed, they are to be interpreted in a generic and descriptive sense only and not for purposes of limitation. In some instances, as would be apparent to one of ordinary skill in the art as of the filing date of the present application, features, characteristics, and/or elements described in connection with a particular embodiment may be used singly or in combination with features, characteristics, and/or elements described in connection with other embodiments, unless otherwise specifically indicated. Accordingly, it will be understood by those of ordinary skill in the art that various changes may be made to the described embodiments without departing from the spirit and scope of the present invention as set forth in the following claims.

What is claimed is:

1. A flexible touch screen panel, comprising:
   a flexible window substrate;
   a polarizing functional layer attached on a first surface of the flexible window substrate, the polarizing functional layer being divided into an active area and an inactive area positioned outside of the active area;

sensing patterns in the active area on a first surface of the polarizing functional layer; and sensing lines in the inactive area on the first surface of the polarizing functional layer, the sensing lines being connected to the sensing patterns, wherein the polarizing functional layer has a laminated structure in which a polarizer and a retardation compensation film are attached on the first surface of the flexible window substrate, and an angle between an absorption axis of the polarizer and a bending axis of the touch screen panel is about 45 to about 90 degrees.

2. The flexible touch screen panel of claim 1, wherein the polarizer is attached on the first surface of the flexible window substrate by a transparent adhesive layer, and the retardation compensation film is attached on a first surface of the polarizer through an other transparent adhesive layer.

3. The flexible touch screen panel of claim 2, wherein each of the transparent adhesive layer and the other transparent adhesive layer is independently a solvent-type adhesive, a film-type adhesive, or a combination thereof.

4. The flexible touch screen panel of claim 3, wherein the solvent-type adhesive is an aqueous poly vinyl alcohol (PVA) adhesive, a polyester-based adhesive, a polyurethane-based adhesive, or a combination thereof.

5. The flexible touch screen panel of claim 3, wherein the film-type adhesive is a polyacryl-based adhesive, a polysilicon-based adhesive, or a combination thereof.

6. The flexible touch screen panel of claim 1, wherein the flexible window substrate is made of polymethyl methacrylate, acryl, polyester, or a combination thereof.

7. The flexible touch screen panel of claim 1, wherein the polarizer comprises a stretched polymer film, and the absorption axis of the polarizer is in a direction of stretching of the stretched polymer film.

8. The flexible touch screen panel of claim 7, wherein the polymer film comprises a PVA-based resin material.

9. The flexible touch screen panel of claim 1, wherein the sensing patterns comprise:
first sensing cells configured to be connected along a first direction;
first connecting lines configured to connect adjacent ones of the first sensing cells to each other;
second sensing cells configured to be connected along a second direction; and
second connecting lines configured to connect adjacent ones of the second sensing cells to each other.

10. The flexible touch screen panel of claim 9, further comprising an insulating layer at points of intersection of the first connecting lines and the second connecting lines.

11. A flexible display device, comprising:
a flexible touch screen panel, comprising:
a flexible window substrate;
a polarizing functional layer attached on a first surface of the flexible window substrate, the polarizing functional layer being divided into an active area and an inactive area positioned outside of the active area;
sensing patterns in the active area on a first surface of the polarizing functional layer; and
sensing lines in the inactive area on the first surface of the polarizing functional layer, the sensing lines being connected to the sensing patterns,
wherein the polarizing functional layer has a laminated structure in which a polarizer and a retardation compensation film are attached on the first surface of the flexible window substrate, and an angle between an absorption axis of the polarizer and a bending axis of the touch screen panel is about 45 to about 90 degrees; and
a display device attached facing the sensing patterns and the sensing lines in a direction of the first surface of the flexible window substrate.

12. The flexible display device of claim 11, wherein the flexible display device is an organic light emitting display device.

13. The flexible display device of claim 11, wherein the window substrate is formed of polymethyl methacrylate, acryl, polyester, or a combination thereof.

14. The flexible display device of claim 11, wherein the polarizer is attached on the first surface of the flexible window substrate by a transparent adhesive layer, and the retardation compensation film is attached on a first surface of the polarizer through an other transparent adhesive layer.

15. The flexible display device of claim 14, wherein each of the transparent adhesive layer and the other transparent adhesive layer is independently a solvent-type adhesive, a film-type adhesive, or a combination thereof.

16. The flexible display device of claim 15, wherein the solvent-type adhesive is an aqueous poly vinyl alcohol (PVA) adhesive, a polyester-based adhesive, a polyurethane-based adhesive, or a combination thereof.

17. The flexible display device of claim 15, wherein the film-type adhesive is a polyacryl-based adhesive, a polysilicon-based adhesive, or a combination thereof.

18. The flexible display device of claim 11, wherein the polarizer comprises a stretched polymer film, and the absorption axis of the polarizer is in a direction of stretching of the stretched polymer film.

19. The flexible display device of claim 18, wherein the polymer film comprises a PVA-based resin material.

* * * * *